United States Patent
Tokairin (10) Patent No.: US 9,996,174 B2
(45) Date of Patent: Jun. 12, 2018

(54) IMAGING DEVICE WITH REVIEW DISPLAY CONTROL FUNCTION

(71) Applicant: CASIO COMPUTER CO., LTD., Shibuya-ku, Tokyo (JP)

(72) Inventor: Yuko Tokairin, Kawasaki (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 151 days.

(21) Appl. No.: 13/864,999

(22) Filed: Apr. 17, 2013

(65) Prior Publication Data

US 2013/0278808 A1 Oct. 24, 2013

(30) Foreign Application Priority Data

Apr. 20, 2012 (JP) ................................ 2012-096768

(51) Int. Cl.
| | |
|---|---|
| *G06F 3/041* | (2006.01) |
| *G06F 3/0488* | (2013.01) |
| *H04N 1/00* | (2006.01) |
| *H04N 101/00* | (2006.01) |

(52) U.S. Cl.
CPC ............ *G06F 3/041* (2013.01); *G06F 3/0488* (2013.01); *H04N 1/00411* (2013.01); *H04N 2101/00* (2013.01); *H04N 2201/0084* (2013.01)

(58) Field of Classification Search
USPC .................................................... 348/333.01
See application file for complete search history.

(56) References Cited

U.S. PATENT DOCUMENTS

| 6,919,927 | B1* | 7/2005 | Hyodo ..................... 348/333.02 |
|---|---|---|---|
| 7,034,881 | B1 | 4/2006 | Hyodo et al. |
| 8,380,676 | B1* | 2/2013 | Eastham et al. .............. 707/662 |
| 2003/0058255 | A1* | 3/2003 | Yamagishi ..................... 345/619 |
| 2008/0074499 | A1* | 3/2008 | Niimura ..................... 348/207.1 |
| 2009/0002334 | A1* | 1/2009 | Karoji ............................ 345/173 |
| 2009/0040315 | A1* | 2/2009 | Nakase et al. ........... 348/207.99 |

(Continued)

FOREIGN PATENT DOCUMENTS

| JP | 11-136568 A | 5/1999 |
|---|---|---|
| JP | 2002-281365 A | 9/2002 |

(Continued)

OTHER PUBLICATIONS

Japanese Office Action dated Feb. 3, 2014 (and English translation thereof) in counterpart Japanese Application No. 2012-096768.

(Continued)

*Primary Examiner* — Roberto Velez
*Assistant Examiner* — Yih-Sien Kao
(74) *Attorney, Agent, or Firm* — Holtz, Holtz & Volek PC (57) ABSTRACT

A camera according to the present invention includes a touch display section in addition to an imaging section. During review display where a captured image is displayed on a display panel (a monitor screen) of the touch display section for a predetermined amount of time after imaging every time the imaging section performs imaging, when a touch operation is performed on a touch panel of the touch display section, a control section controls a method of performing the review display (for example, a review display time) according to the state of the touch operation.

12 Claims, 8 Drawing Sheets

(56) References Cited

U.S. PATENT DOCUMENTS

| | | | |
|---|---|---|---|
| 2010/0026643 A1* | 2/2010 | Ozawa et al. | 345/173 |
| 2010/0125786 A1 | 5/2010 | Ozawa et al. | |
| 2011/0085778 A1* | 4/2011 | Iwase et al. | 386/228 |
| 2011/0249146 A1* | 10/2011 | Ishida | 348/231.99 |

FOREIGN PATENT DOCUMENTS

| | | | |
|---|---|---|---|
| JP | 2006-311209 A | | 11/2006 |
| JP | 2006311209 A | * | 11/2006 |
| JP | 2008-257427 A | | 10/2008 |
| JP | 2008-283606 A | | 11/2008 |
| JP | 2008283606 A | * | 11/2008 |
| JP | 2010-055598 A | | 3/2010 |
| JP | 2010-124181 A | | 6/2010 |
| JP | 2010-166459 A | | 7/2010 |
| JP | 2011-040897 A | | 2/2011 |
| JP | 2011-188315 A | | 9/2011 |

OTHER PUBLICATIONS

Japanese Office Action dated Oct. 23, 2013 (and English translation thereof) in counterpart Japanese Application No. 2012-096768.

* cited by examiner

3c SLIDE TABLE

| MOVEMENT DISTANCE | DISPLAY TIME |
|---|---|
| ~10mm | ONE SECOND |
| 11mm~20mm | FIVE SECONDS |
| 21mm~30mm | TEN SECONDS |
| 31mm~40mm | TWENTY SECONDS |
| 41mm~ | PREVIOUS TIME (EX. TEN SECONDS) |

FIG. 3B

3d CHARACTER RECOGNITION TABLE

| CHARACTER, NUMERAL, AND SIGN TO BE RECOGNIZED | DISPLAY TIME |
|---|---|
| 1~9 | ZERO - NINE SECONDS |
| 0— | TEN SECONDS |
| + | TWENTY SECONDS |
| OTHERS | PREVIOUS TIME (EX. TWENTY SECONDS) |

IMAGING DEVICE WITH REVIEW DISPLAY CONTROL FUNCTION

CROSS-REFERENCE TO RELATED APPLICATION

This application is based upon and claims the benefit of priority from the prior Japanese Patent Application No. 2012-096768, filed Apr. 20, 2012, the entire contents of which is incorporated herein by reference.

BACKGROUND OF THE INVENTION

1. Field of the Invention

The present invention relates to an imaging device having an imaging section which captures an image, imaging processing method, and storage medium.

2. Description of the Related Art

Conventionally, in an imaging device such as a digital still camera having a review function by which review display of a captured image is performed for a predetermined amount of time immediately after imaging, there is a technology allowing the review display time (the predetermined amount of time) immediately after imaging to be arbitrarily set according to a user's preference. Also, as a technology for cancelling review display, a technology has been conventionally disclosed in Japanese Patent Application Laid-Open (Kokai) Publication No. 2011-040897 in which, when imaging is performed by a pressing operation on a touch panel, a press input area for switching to an imaging wait state is displayed in addition to review display.

SUMMARY OF THE INVENTION

In accordance with one aspect of the present invention, there is provided an imaging device comprising: an imaging section which captures an image; a monitor screen; a touch panel provided on the monitor screen; a first determining section which determines whether a touch operation has been performed on the touch panel during review display where the captured image is displayed on the monitor screen for a predetermined amount of time after image capturing by the imaging section; a second determining section which determines, when the first determining section determines that a touch operation has been performed on the touch panel during the review display, a state of the touch operation; and a display control section which controls a method of performing the review display according to the state of the touch operation determined by the second determining section.

In accordance with another aspect of the present invention, there is provided an imaging processing method comprising: a step of determining whether a touch operation has been performed on a touch panel on a monitor screen during review display where a captured image is displayed on the monitor screen for a predetermined amount of time after image capturing by an imaging section which captures an image; a step of determining, when a touch operation is determined to have been performed on the touch panel during the review display, a state of the touch operation; and a step of controlling a method of performing the review display according to the determined state of the touch operation.

In accordance with another aspect of the present invention, there is provided a non-transitory computer-readable storage medium having stored thereon a program that is executable by a computer, the program being executable by the computer to perform functions comprising: processing for determining whether a touch operation has been performed on a touch panel on a monitor screen during review display where a captured image is displayed on the monitor screen for a predetermined amount of time after image capturing by an imaging section which captures an image; processing for determining, when a touch operation is determined to have been performed on the touch panel during the review display, a state of the touch operation; and processing for controlling a method of performing the review display according to the determined state of the touch operation.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4 is a flowchart outlining operations of the characteristic portion of a first embodiment in the entire camera operation which is started when power is turned ON;

FIG. 8 is a flowchart outlining operations of the characteristic portion of a second embodiment in the entire camera operation which is started when power is turned ON.

DETAILED DESCRIPTION OF THE PREFERRED EMBODIMENTS

Preferred embodiments of the present invention will hereinafter be described with reference to the drawings.

First Embodiment

First, a first embodiment of the present invention is described with reference to FIG. 1 to FIG. 7.

Figure 1:
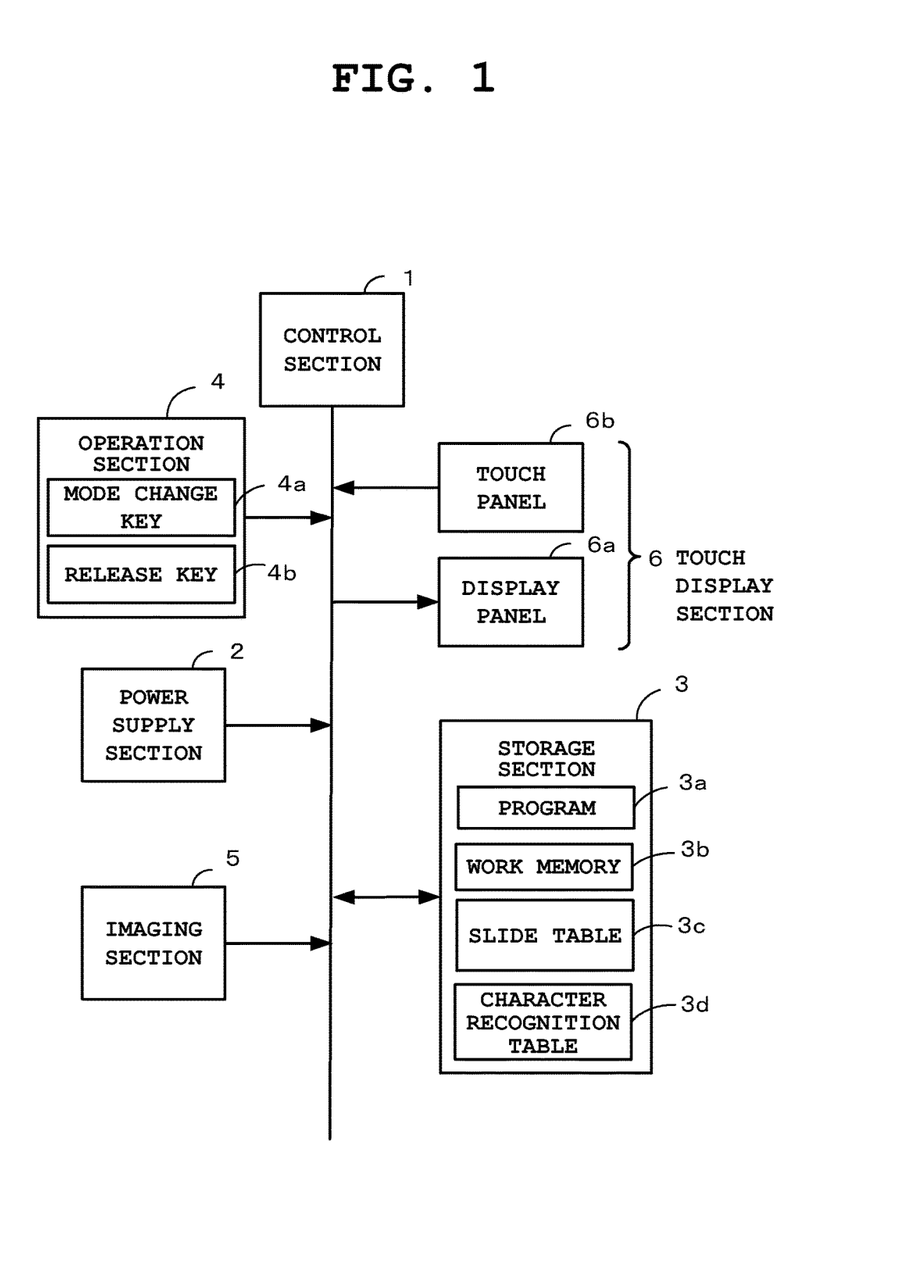
FIG. 1 is a block diagram depicting basic components of a digital camera to which the present invention has been applied as an imaging device.

The present embodiment exemplifies a case in which the present invention is applied to a digital camera as an imaging device. FIG. 1 is a block diagram depicting basic components of the digital camera.

The imaging device (digital camera) is a compact camera capable of imaging not only still images but also moving images, which has basic functions such as an imaging function and a timing function, a review display function, a touch shutter function, a character recognition function, etc. A control section 1 operates with power supplied from a power supply section (a secondary battery) 2, and controls the entire operation of the camera according to various programs in a storage section. This control section 1 is provided with a CPU (Central Processing Unit), a memory, and the like not shown.

The storage section 3 is configured to include a ROM (Read-Only Memory) and a flash memory, and has a program memory 3a having stored therein programs and various applications for achieving the present embodiment according to operation procedures depicted in FIG. 4 to FIG. 7 described further below, a work memory 3b that temporarily stores various information (for example, a flag) required for the camera to operate, a slide table 3c described further below, a character recognition table 3d, etc. The storage section 3 may be configured to include a removable portable memory (a recoding medium) such as an SD (Secure Digital) card or an IC (Integrated Circuit) card. Although not shown, the storage section 3 may include a storage area on a predetermined server device side in a case where the camera is connected to a network via a communication function.

An operation section 4 includes, as push-button-type keys, a mode change key 4a that switches between an imaging mode for imaging and a replay mode for replaying a captured image (a stored image), a release key 4b for giving an instruction to start imaging, and various keys (omitted in the drawings) for setting imaging conditions such as exposure and shutter speed. In accordance with an input operation signal corresponding to an operation key which is outputted from the operation section 4, the control section 1 performs, for example, mode change processing, imaging processing, and image condition setting processing.

An imaging section 5 constitutes, although omitted in the drawings, a camera section capable of imaging a subject with high definition by forming a subject image from an optical lens onto an imaging element (such as a CCD (Charge-Coupled Device) or a CMOS (Complementary Metal-Oxide Semiconductor)), and has an imaging lens, an imaging element, a stroboscope, various sensors, an analog processing section, and a digital processing section. This imaging section 5, which is capable of capturing still images and moving images, performs color separation, gain adjustment for each RGB (Red Green Blue) color component, and the like on photoelectrically converted image signals (analog value signals), and after converting the image signals to digital value data, performs color interpolation processing (de-mosaic processing) on the digitalized image data, and displays the image data in full-color on a touch display section 6. In the present embodiment, the imaging section 5 is also capable of performing Auto Focus processing (AF processing), Auto Exposure adjustment processing (AE processing), Auto White Balance adjustment processing (AWB processing), image compression processing, image reconstruction processing, etc.

The touch display section 6 is structured by a touch panel. 6b laminated on a display panel 6a. The display panel 6a is, for example, a high-definition liquid-crystal display or an organic EL (Electro Luminescence) display having an aspect ratio at which the width of the panel is different from its height (width height=4:3), serving as a monitor screen for displaying an image to be captured (a live view image or a review image) or a replay screen for replaying a captured image. The touch panel 6b constitutes a touch screen for detecting a position touched with a finger of an imaging person or the like and inputting coordinate data of the detected position. For example, the touch panel 6b adopts a capacitive type or a resistive-film type, and may adopt another type.

The touch display section 6 is used also for the review display function, the touch shutter function, and the character recognition function. The review display function is a function to perform review display of a captured image on the display panel 6a (a monitor screen) for a predetermined period after imaging every time the imaging section 5 performs imaging. In the present embodiment, when a touch operation is performed on the touch panel 6b during review display, a method of performing review display (for example, a display time of review display) is controlled according to the state of the touch operation. Note that the predetermined amount of time for performing review display after imaging is an amount of time arbitrarily set in advance by a user operation. For example, eight seconds is set as a review display time (a set time).

The touch shutter function is a function to start release processing when, while images from the imaging section 5 are being sequentially displayed on the display panel 6a (the monitor screen) as live view images, a touch operation is performed on an area of the touch panel 6b corresponding to the display position of a subject within the live view display screen in order to designate this subject as an imaging target. In this case, autofocus processing (AF processing) is performed on the subject designated as an imaging target. The character recognition function is a function to recognize a handwritten character that has been inputted by a touch operation (handwriting input) on the touch panel 6b in order to control a review display time according to the state of the touch operation during review display.

Figure 2A:
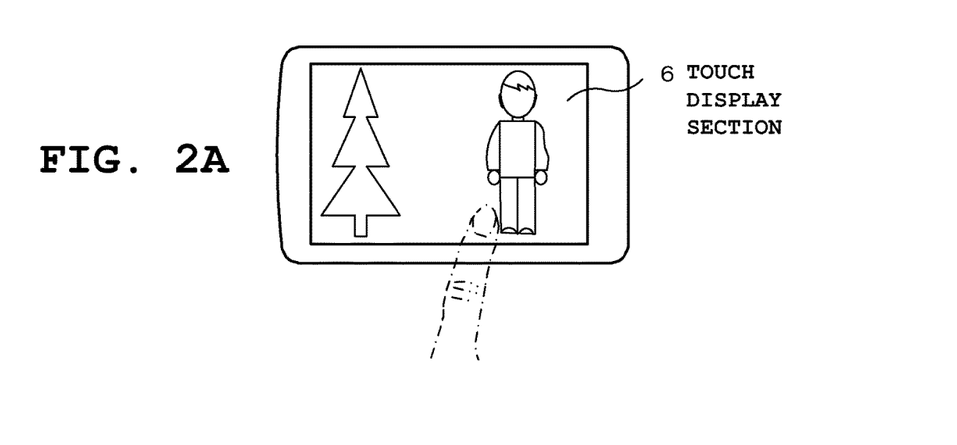
FIG. 2A to FIG. 2C are diagrams for describing a touch operation for controlling a review display time.
Figure 2B:
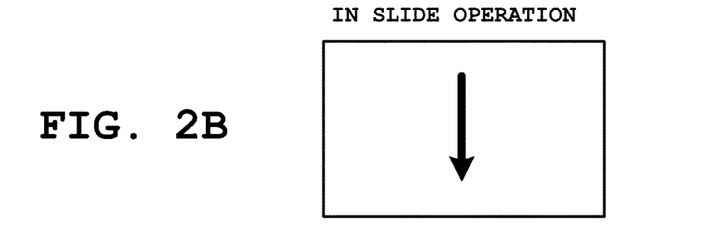
Figure 2C:
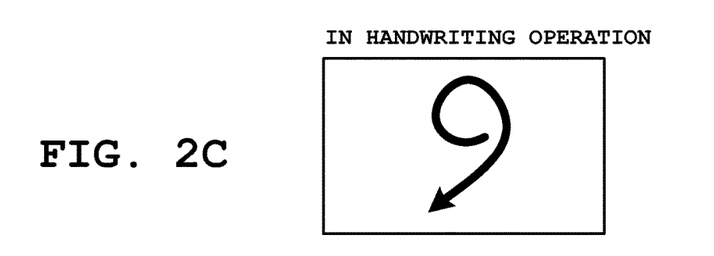

FIG. 2A to FIG. 2C are diagrams for describing a touch operation for controlling a review display time.

FIG. 2A is a diagram exemplifying a case in which a touch operation is performed on the touch panel 6b during review display. That is. FIG. 2A depicts a case in which, when release processing is started by operating the release key 4b or when release processing is started with a touch operation on a subject of a live view image being displayed on the display panel 6a (the monitor screen) (when imaging is started by the touch shutter function), a touch operation is performed on the touch panel 6b during review display after the imaging.

FIG. 2B is a diagram exemplifying a case where a slide operation to move a finger or the like while touching the touch panel 6b is performed during review display after the operation of the release key 4b (after imaging). As such, when a slide operation is performed during review display, the control section 1 calculates the movement distance of the slide operation, refers to the slide table 3c based on the calculation result (the movement distance), and thereby controls the review display time. In the example depicted in the drawing, the operation is linearly performed downward from above. However, the direction of the slide operation (a slide direction) is not restricted to a vertical direction (a longitudinal direction). For example, the slide direction may be a horizontal direction (a lateral direction) or a direction arbitrarily determined. Furthermore, the movement trajectory of the slide is not restricted to be linear but can be curved.

Figure 3A:
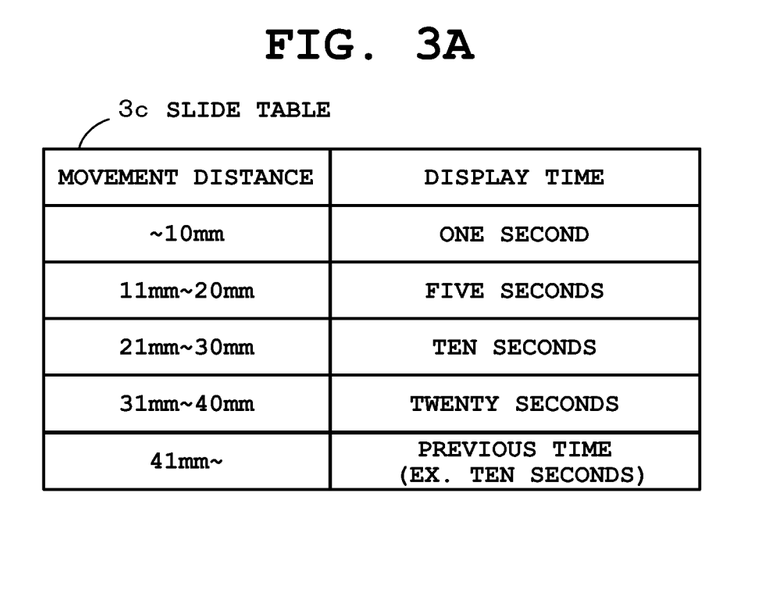
FIG. 3A is a diagram for describing a slide table 3c.

FIG. 3A is a diagram for describing the slide table 3c.

The slide table 3c has stored therein review display times in association with movement distances of slide operations, and has items "movement distance" and "display time" whose states can be arbitrarily set by a user operation. "Movement distance" indicates the state of a touch operation during review display in a case where it is a slide operation, and "display time" indicates a review display time in this case. In the example depicted in the drawing, in association with "10 mm or shorter", "11-20 mm", "21-30 mm" "31-40 mm", and "41 mm or longer" of "movement distance", "one second", "five seconds", "ten seconds", "twenty seconds", and "previous time (for example, ten seconds)" are stored as "display time". Here, "previous time" is a review display time of previous imaging. That is, the control section 1 causes a current review display time to be stored and retained in "previous time" in the slide table 3c as a previous review display time. Then, at the time of the next review display, the control section 1 reads out the stored and retained "previous time", and performs review display for this amount of time.

FIG. 2C is a diagram exemplifying a case where a character is written by a finger or the like touching the touch panel 6b during review display after the operation of the release key 4b (after imaging). The control section 1 recognizes the touch-inputted handwritten character, refers to the character recognition table 3d based on the recognition result (the recognized character), and thereby controls the review display time. In the present embodiment, this character may be an alphabetical character, a hiragana character, a katakana character, a sign, a numeral, etc. In the example depicted in the drawing, a numeral "9" has been written.

Figure 3B:
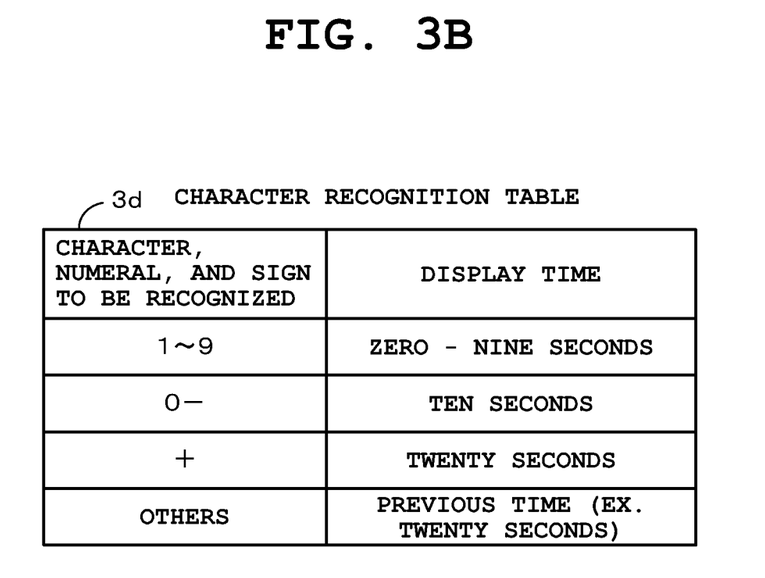
FIG. 3E is a diagram for describing a character recognition table 3d.

FIG. 3B is a diagram for describing the character recognition table 3d.

The character recognition table 3d has stored therein review display times in association with recognition results of handwritten characters, and has items "character, numeral, or sign to be recognized" and "display time" whose states can be arbitrarily set by a user operation. "Character, numeral, or sign to be recognized." indicates the state of a touch operation during review display in a case where it is a character-handwriting-input, and "display time" indicates a review display time in this case. In the example depicted in the drawing, in association with "1-9", "0-", "+", and "others" of "character, numeral, or sign to be recognized", "zero-nine seconds", "ten seconds", "twenty seconds", and "previous time (for example, twenty seconds)" are stored as "display time". As described above, "previous time" is a review display time of previous imaging.

Next, the operation concept of the camera in the first embodiment is described with reference to the flowcharts depicted in FIG. 4 to FIG. 7. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This is also the same in other embodiments described later.

FIG. 4 to FIG. 7 are flowcharts outlining operations of the characteristic portion of the present embodiment in the entire camera operation which is started when power is turned ON.

Figure 4:
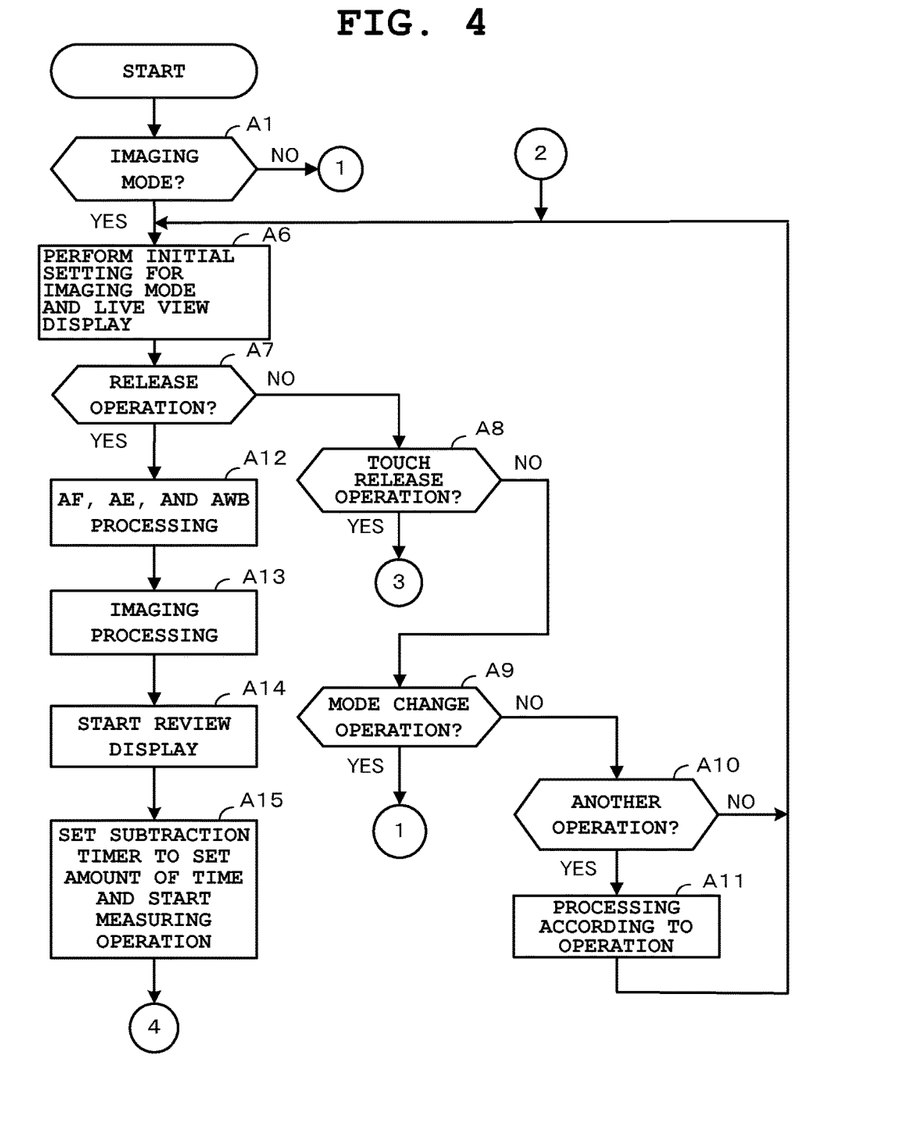

First, the control section 1 judges whether the current operation mode has been switched to the imaging mode (Step A1 of FIG. 4). When the current operation mode has been switched not to the imaging mode but to the replay mode (NO at Step A1), the control section 1 returns to the flow of FIG. 5, and performs processing according to the replay mode. That is, the control section 1 performs initial setting processing for the replay mode, displays captured images (stored images) stored in the storage section 3 as a list on the display panel 6a (a replay screen), and switches the display by displaying an image selected from among the list screen by a user operation on the replay screen (Step A2).

In the state where the current operation mode has been switched to the replay mode, the control section 1 judges whether the mode change key 4a has been operated (Step A3) and whether another operation has been performed (Step A4). When another operation has been performed (YES at Step A4), the control section 1 performs, for example, image forward processing, processing of controlling a slide show, or the like as processing according to the operation (Step A5). Then, the process returns to Step A3 described above. When the mode change key 4a has been operated (YES at Step A3), the control section 1 proceeds to the flow of FIG. 4 to exit the replay mode and enter the imaging mode.

Figure 5:
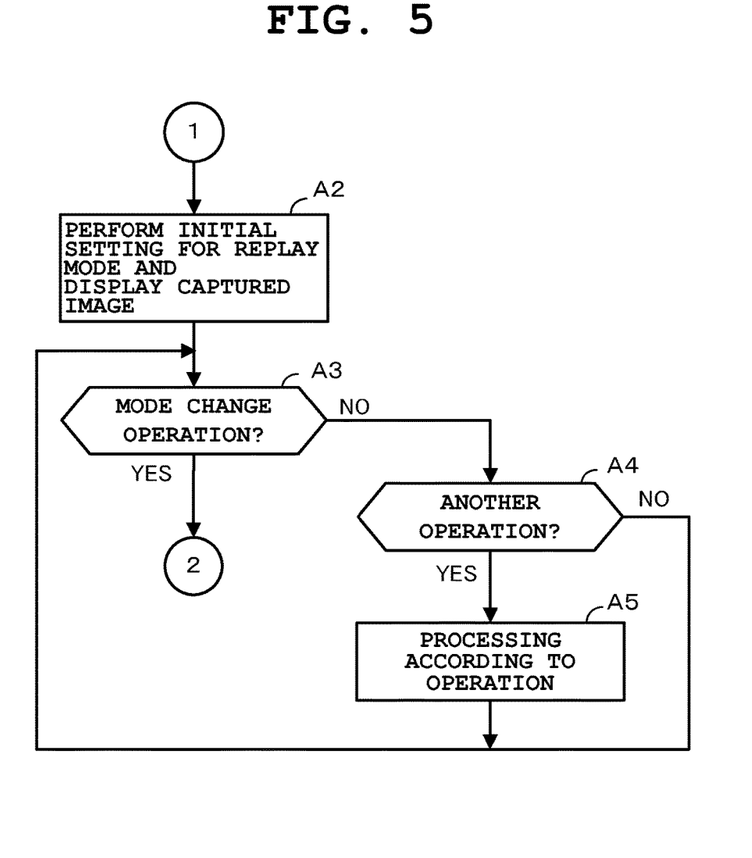
FIG. 5 is a flowchart of operations following those in FIG. 4.

On the other hand, in the state where the current operation mode has been switched to the imaging mode (YES at Step A1 of FIG. 4), the control section 1 performs initial setting processing for the imaging mode and also causes a captured image from the imaging section 5 to be displayed as a live view image on the display panel 6a (the monitor screen) (Step A6). In the state of the live view display, the control section 1 judges whether the release key 4b has been operated (Step A7), whether a touch release operation has been performed (Step A8), whether the mode change key 4a has been operated (Step A9), and whether another operation has been performed (Step A10).

Here, when another operation has been performed (YES at Step A10), the control section 1 performs, for example, exposure adjustment zoom adjustment, or the like, as processing according to the operation (Step A11), and then returns to Step A6 described above. When the mode change key 4a has been operated (YES at Step A9), the control section 1 proceeds to the flow of FIG. 5, and performs the above-described processing according to the replay mode.

Here, when the release key 4b has been operated in the state of the live view display (YES at Step A7), the control section 1 performs autofocus processing (AF processing) exposure adjustment processing (AE processing), and auto white balance adjustment processing (AWB) (Step A12). In addition, the control section 1 performs imaging processing for compressing and storing a captured image obtained from the imaging section 5 (Step A13). Then, the control section 1 starts review display by causing the captured image to be displayed as a review image on the display panel 6a (the monitor screen) (Step A14). Also, the control section 1 sets a subtraction timer that measures a review display time (omitted in the drawings) to a set amount of time, and thereby starts a measuring operation (Step A15). In this case, the control section 1 sets the subtraction timer to a predetermined amount of time which has been set in advance as a review display time (for example, three seconds) and serves as an initial value, and thereby starts the measuring operation.

Figure 6:
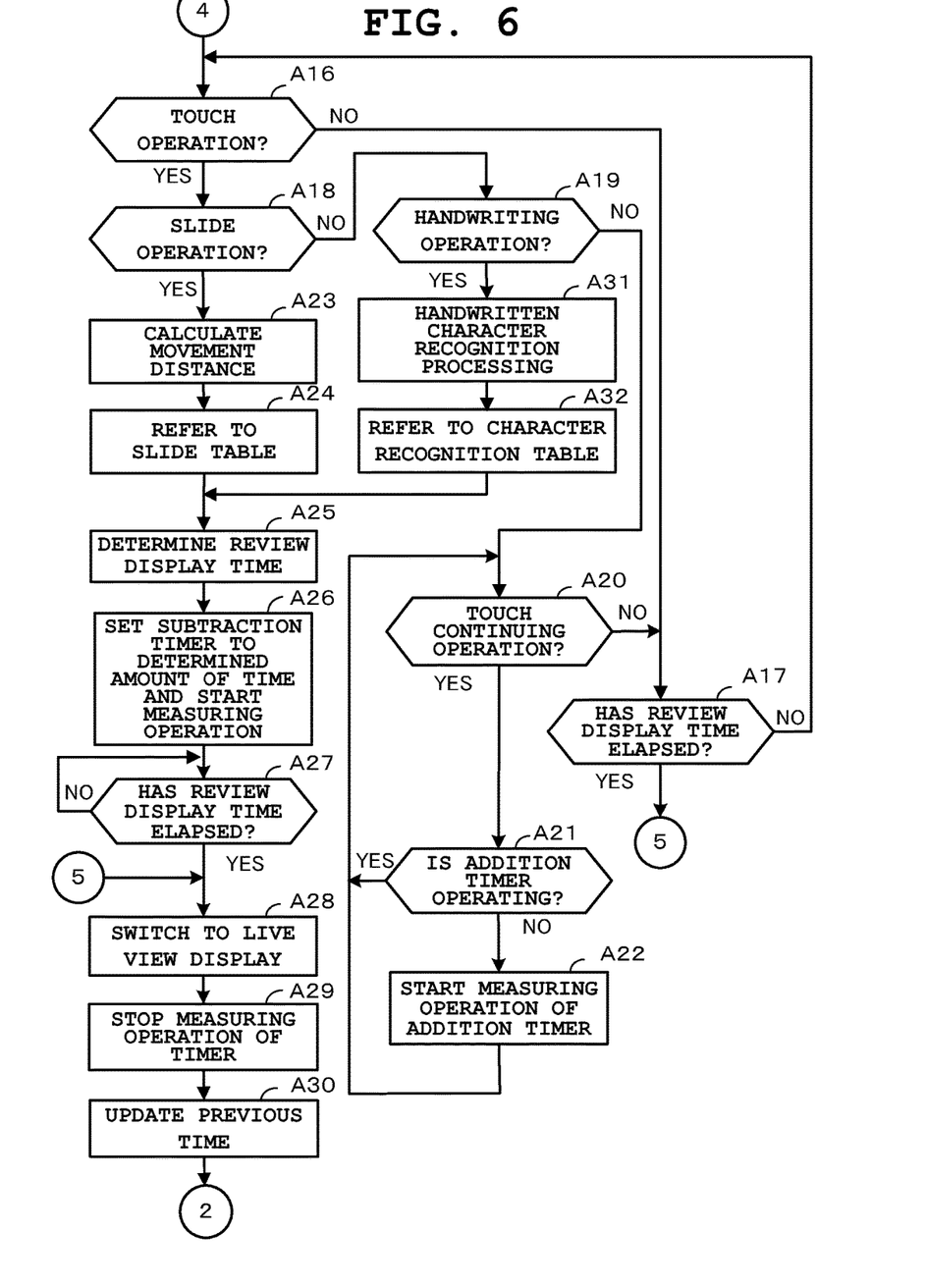
FIG. 6 is a flowchart of operations following those in FIG. 4.

Then, the control section 1 returns to the flow of FIG. 6, and judges whether a touch operation has been performed on the touch panel 6b during the review display (Step A16). When a touch operation has not been performed (NO at Step A16), the control section 1 judges whether the review display time (the amount of time set at Step A15: for example, three seconds) has elapsed (Step A17). Here, when the review display time (the set amount of time) has not elapsed (NO at Step A17), the control section 1 returns to Step A16 described above, and enters a wait state while repeating the operations at Step A16 and Step A17 described above.

Here, when the subtraction timer reaches time out and the review display time elapses (YES at Step A17) without a touch operation being performed during the review display (NO at Step A16), the control section 1 switches the display state of the display panel 6a (the monitor screen) from the review display to live view display (Step A28). In addition, the control section 1 stops the measuring operation of the timer (in this case, the subtraction timer) (Step A29). Subsequently, the control section 1 performs processing for updating the "previous time" by storing the current review display time (in this case, the amount of time set at Step A15: for example, three seconds) as the "previous time" in the slide table 3c and the character recognition table 3d (Step A30). Then, the control section 1 returns to Step A6 of FIG. 4.

At Step A16, when a touch operation has been performed during the review display (YES at Step A16), the control section 1 judges whether the touch operation is a slide operation (Step A18), whether the touch operation is a handwriting operation for handwriting a character with a touch input (Step A19), and whether the touch operation is a touch continuing operation for continuously touching the same position (Step A20). Here, when the touch operation is none of the above (NO at Step A20) the control section 1 proceeds to Step A17 described above. When the touch operation performed during the review display is a touch continuing operation (YES at Step A20), the control section 1 starts a measuring operation (Step A22) on condition that an addition timer (omitted in the drawings) that measures a review display continuation time is not performing a measuring operation (NO at Step A21). Subsequently, the control section 1 returns to Step A20, and proceeds to Step A21 when the touch operation is a touch continuing operation (YES at Step A20). In this case, since the addition timer is performing a measuring operation (YES at Step A21), the control section 1 returns to Step A20 and, until the touch continuing operation is terminated, stays in a wait state while repeating the operation described above.

Here, when the touch continuing operation is terminated (NO at Step A20), the control section 1 proceeds to Step A17 described above. In this case, if the review display time has not elapsed when the touch continuing operation is terminated, or in other words, if the touch continuing operation is terminated before the review display time elapses (NO at Step A17), the control section 1 returns to Step A16, and waits until the time elapses. Also, if the review display time has elapsed when the touch continuing operation is terminated, or in other words, if the touch continuing operation is terminated after the elapse of the review display time (YES at Step A17), the control section 1 proceeds to Step A28 described above, and switches the review display to live view display. Subsequently, the control section 1 stops the measuring operation of the timers (in this case, the subtraction timer and the addition timer described above) (Step A29). Then, the control section 1 performs processing for updating the "previous time" by storing the current review display time (in this case, the measuring time or the set amount of time of the addition timer described above) as the "previous time" in the slide tale 3c and the character recognition table 3d (Step A30), and returns to Step A6 of FIG. 4.

When the touch operation performed during the review display is a slide operation (YES at Step A18), the movement distance of the operation is calculated (Step A23). Then, by referring to the slide table 3c based on the calculation result (the movement distance) (Step A24), the control section 1 reads out a "display time" corresponding to the movement distance, and determines this "display time" as the review display time (Step A25). For example, if the movement distance is "10 mm or shorter" the review display time is "one second". If the movement distance is "21-30 mm", the review display time is "five seconds". If the movement distance is "31-40 mm", the review display time is "ten seconds". If the movement distance is "41 mm or longer", the review display time is the same as the previous time (for example, ten seconds). Subsequently, the control section 1 sets the subtraction timer described above to the determined "display time", and starts a measuring operation (Step A26). Then, the control section 1 enters a wait state, and stays in this state until the subtraction timer reaches time out (until the review display time elapses).

Here, when the subtraction timer reaches time out and the review display time elapses (YES at Step A27), the control section 1 switches the review display to live view display (Step A28). Then, the control section 1 stops the measuring operation of the timer (in this case, the subtraction timer described above) (Step A29). In addition, the control section 1 updates the "previous time" by storing the current review display time (in this case, the amount of time determined as described above) as the "previous time" in the slide tale 3c and the character recognition table 3d (Step A30). Then, the control section 1 returns to Step A6 of FIG. 4.

When the touch operation during the review display is a character handwriting operation (YES at Step A19), the control section 1 performs processing for recognizing the handwritten-inputted character (Step A31). Then, by referring to the character recognition table 3d based on the recognition result (the recognized character) (Step A32), the control section 1 reads out a "display time" corresponding to the recognized character, and determines this "display time" as the review display time (Step A25). For example, if the recognized character is "1-9", the review display time is "zero to nine seconds". If the recognized character is "0-", the review display time is "ten seconds". If the recognized character is "+" the review display time is "twenty seconds". If the recognized character is "others", the review display time is the same as the previous time (for example, twenty seconds). Then, the control section 1 sets the subtraction timer to the determined "display time", and after starting a measuring operation (Step A26), waits until the review display time elapses (Step A27).

Here, when the subtraction timer reaches time out and the review display time elapses (YES at Step A27), the control section 1 switches the review display to live view display (Step A28). Subsequently, the control section 1 stops the measuring operation of the timer (in this case, the subtraction timer described above) (Step A29). Then, the control section 1 updates the "previous time" by storing the current review display time (in this case, the amount of time determined as described above) as the "previous time" in the slide tale 3c and the character recognition table 3d (Step A30), and returns to Step A6 of FIG. 4.

Figure 7:
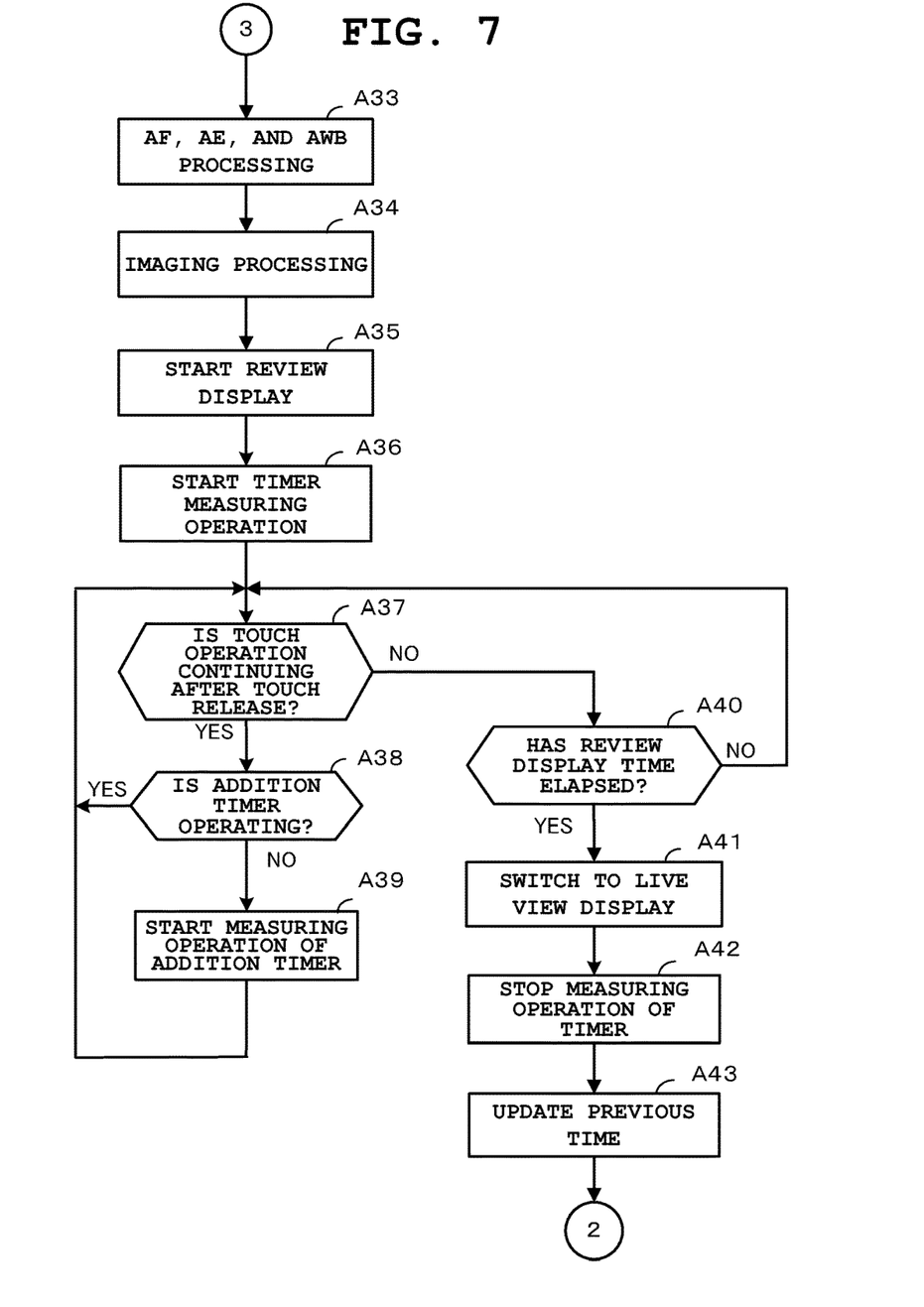
FIG. 7 is a flowchart of operations following those in FIG. 4.

At Step A8, if a touch release operation (a touch shutter operation) has been performed (YES at Step A8 of FIG. 4), the control section 1 proceeds to the flow of FIG. 7, and performs autofocus processing (AF processing), exposure adjustment processing (AE processing), and auto white balance adjustment processing (AWB) (Step A33). Then, after performing imaging processing for compressing and storing a captured image obtained from the imaging section 5 (Step A34), the control section 1 starts review display by causing the captured image to be displayed as a review image on the display panel 6a (the monitor screen) (Step A35). In addition, the control section 1 starts a measuring operation of the subtraction timer (Step A36). In this case, the control section 1 sets the subtraction timer to a predetermined amount of time which has been set in advance as a review display time (for example, three seconds) and serves as an initial value.

Then, the control section 1 judges whether a touch operation has been continued even after the touch release operation, or in other words, whether a touch continuing operation during the review display has been detected (Step A37). When a touch operation has been performed even during the review display after the touch release operation (YES at Step A37), the control section 1 starts a measuring operation (Step A39) on condition that an addition timer that measures a continuation time of review display (omitted in the drawings) is not performing a measuring operation (NO at Step A38), and then returns to Step A37.

Here, if the review display time has not elapsed when the touch operation is terminated (NO at Step A40), the control section 1 returns to Step A37 and waits until the display time elapses. If the review display time has elapsed when the touch operation is canceled, or in other words, when the touch operation is terminated, after the elapse of the review display time (YES at Step A40), the control section 1 switches the display state from the review display to live view display (Step A41). Subsequently, the control section 1 stops the measuring operation of the timers (in this case, the subtraction timer and the addition timer described above) (Step A42). In addition, the control section 1 performs processing for updating the "previous time" by storing the current review display time (in this case, the measuring time or the set amount of time of the addition timer) as the "previous time" in the slide table 3c and the character recognition table 3d (Step A43). Then, the control section 1 returns to Step A6 of FIG. 4.

As described above, in the first embodiment, when a touch operation is performed on the touch panel 6b of the display panel 6a performing review display in which a captured image is displayed on the display panel 6a for a predetermined amount of time after imaging every time the imaging section 5 performs imaging, the control section 1 controls a method of performing the review display (for example, a display time) according to the state of the touch operation. Therefore, it is possible to easily control review display after imaging for each imaging without preparing an operator such as a special button, thereby enhancing operability and flexibility.

If a touch operation during review display continues, the review display also continues. With this, only by continuously performing a touch operation at any position on the touch panel 6b, an imaging person (a user) can continue review display. This is convenient when, for example, a captured image is desired to be carefully checked. Also, only by cancelling a touch operation, review display can be easily canceled.

When a touch operation on the touch panel 6b is performed based on the touch shutter function, and the touch release operation (touch shutter operation) continues during review display after the imaging, the review display also continues. Therefore, when, for example, a captured image is desired to be carefully checked, it is only required that the touch release operation is continued, and this is convenient. Also, only by cancelling a touch operation, review display can be easily canceled.

When a touch operation on the touch panel 6b is performed during review display, the type of the touch operation is determined as the state of the touch operation. Therefore, only by changing the type of a touch operation, review display can be controlled.

When a touch operation performed during review display is a slide operation, the movement distance of the slide operation is determined as the state of the touch operation. Therefore, review display can be controlled by a slide operation on the touch panel 6b which is a sensibly easy-to-understand operation.

When a touch operation performed during review display is a handwriting operation for handwriting a character, the handwritten character is determined as the state of the touch operation. Therefore, review display can be controlled by an operation to handwrite a character on the touch panel 6b which is a sensibly easy-to-understand operation.

Also, since a review display time is controlled according to the state of a touch operation, the present invention is convenient when, for example, a captured image is carefully checked or when confirmation of a captured image is not required.

Moreover, since a current review display time is stored and retained as a previous review display time, and the next review display is performed for an amount of time equal to the previous review display time stored and retained, the same review display time as the previous time can be set only by a touch operation. With this, usability can be further improved.

In the above-described first embodiment, even after a touch release operation, review display continues if the touch operation continues. However, a configuration may be adopted in which, after the end of a touch operation, review display is further continued for a predetermined amount of time. Also, a configuration may be adopted in which review display is continued by a slide operation or a character handwriting operation after a touch release operation.

Also, in the first embodiment, review display may continue not by a slide operation or a character handwriting operation performed immediately after the start of a touch operation but by a slide operation or a character handwriting operation performed a predetermined time after a touch operation. In this case, in addition to review display performed for a predetermined amount of time by a touch operation, review display by a slide operation or a character handwriting operation is performed.

In the first embodiment a slide operation, a character handwriting operation, and a touch continuing operation have been given as the state of a touch operation. However, the present invention is not limited thereto. For example, plural touch operations in which a touch operation is successively performed for a plurality of times, or a multi-touch operation in which a plurality of fingers simultaneously performs touch operations may be determined as the state of a touch operation.

Second Embodiment

A second embodiment of the present invention is described below with reference to FIG. 8.

In the first embodiment described above, if a review display time (set amount of time) has not elapsed when a touch operation is terminated, the review display continues until the set amount of time elapses. In the second embodiment, review display is stopped when a touch operation is terminated, irrespective of whether the review display time has elapsed. Note that sections that are basically the same or have the same name in both embodiments are given the same reference numerals, and therefore explanations thereof are omitted. Hereafter, the characteristic portions of the second embodiment will mainly be described.

Figure 8:
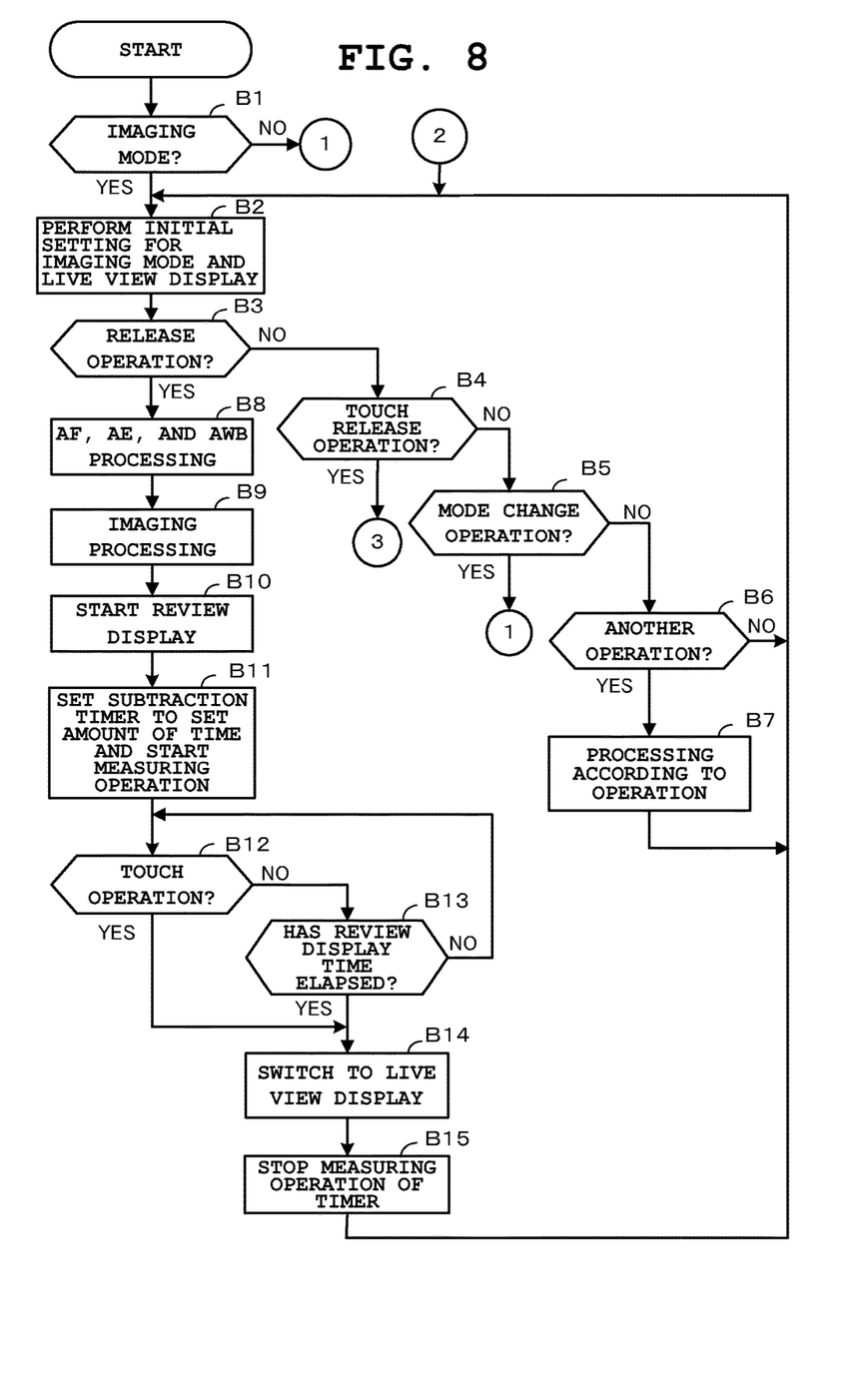

FIG. 8 is a flowchart outlining operations of the characteristic portion of the second embodiment in the entire camera operation which is started when power is turned ON.

Here, Step B1 to Step B11 are the same as Step A1 and Step A6 to Step A15 of FIG. 4, and therefore are briefly described herein.

First, if the current operation mode has been switched to the replay mode (NO at Step B1), the control section 1 proceeds to the flow of FIG. 5 described above and performs processing according to the replay mode which is the same as that described above. If the current operation mode has been switched to the imaging mode (YES at Step B1), the control section 1 performs initial setting processing for the imaging mode for live view display (Step B2). In this state, the control section 1 judges whether the release key 4b has been operated (Step B3), whether a touch release operation has been performed (Step B4), whether the mode change key 4a has been operated (Step B5), and whether another operation has been performed (Step B6).

Here, if another operation has been performed (YES at Step B6), the control section 1 performs processing according to the operation (Step B7). If the mode change key 4a has been operated (YES at Step B5), the control section 1 performs returns to the flow of FIG. 5, and performs processing according to the replay mode (processing that is the same as that of the first embodiment described above). If a touch release operation (a touch shutter operation) has been performed (YES at Step B4), the control section 1 proceeds to the flow of FIG. 7, and hereafter performs processing that is the same as that of the first embodiment described above. If the release key 4b has been operated (YES at Step B3), the control section 1 performs autofocus processing (AF processing), exposure adjustment processing (NE processing), and auto white balance adjustment processing (AWB) (Step B8), and then performs imaging processing (Step B9).

After the imaging, the control section 1 starts review display of the captured image (Step S10). Also, the control section 1 sets the subtraction timer described above (omitted in the drawings) to a set amount of time, and thereby starts a measuring operation (Step B11). Then, the control section 1 judges whether a touch operation on the touch panel 6h has been performed during the review display (Step B12). Here, if a touch operation has not been performed (NO at Step B12), the control section 1 judges whether the review display time (the amount of time set at Step B11: for example, three seconds) has elapsed (Step B13). If the display time has not elapsed (NO at Step B13), the control section 1 returns to Step B12 described above, and enters a wait state while repeating the processing at Step B12 and Step B13 described above.

In this state, if the subtraction timer reaches time out and the review display time elapses (YES at Step B13), the control section 1 switches the review display to live view display (Step B14). Then, after stopping the subtraction timer (Step B15), the control section 1 returns to Step B2 described above. At Step B12, if a touch operation on the touch panel 6b has been performed during the review display (YES at Step B12), the control section 1 switches the review display to live view display, irrespective of whether the review display time has elapsed (Step B14). Then, the control section 1 stops the measuring operation of the subtraction timer (Step B15), and returns to Step B2 described above.

As described above, in the second embodiment, when a touch operation is performed during review display, the review display is stopped and switched to live view display. Therefore, it is possible to make a transition from review display to live view display without waiting for the elapse of the review display time (set amount of time), which improves usability.

In the second embodiment described above, the manner of a touch operation during review display is not limited. However, a configuration may be adopted in which review display is stopped and switched to live view display when a slide operation is performed. Also, plural touch operations in which a touch operation is successively performed for a plurality of times, or a multi-touch operation in which a plurality of fingers simultaneously performs touch operations may be performed.

In each of the embodiments described above, a review display time is controlled according to the state of a touch operation. However, the present invention is not limited thereto. For example, review display of moving images acquired before and after the capturing of an image (a still image) may be performed. Also, brightness and color tone of a captured image on review display may be changed.

Moreover, in each of the embodiments described above, the present invention has been applied to a digital camera (a compact camera) as an imaging device. However, the present invention is not limited thereto and may be applied to, for example, a personal computer having a camera function, a PDA (Personal Digital Assistant), a digital camera, a music player, or, as a matter of course, a single-lens reflex camera.

Furthermore, the "devices" or the "sections" described in the above-described embodiments are not required to be in a single housing, and may be separated into a plurality of housings by function. In addition, the steps in the above-described flowcharts are not required to be processed in time series, and may be processed in parallel, or individually and independently.

While the present invention has been described with reference to the preferred embodiments, it is intended that the invention be not limited by any of the details of the description therein but includes all the embodiments which fall within the scope of the appended claims

What is claimed is:

1. An imaging device comprising:
   an imaging section;
   a monitor screen;
   a touch panel provided on the monitor screen;
   an operator different from the touch panel; and
   a CPU which is configured to:
   in a state in which images from the imaging section are being sequentially displayed as live view images on the monitor screen, perform review display in which an image, which is captured by the imaging section according to an inputted imaging instruction, is displayed on the monitor screen for a predetermined amount of time after the image is captured,
   perform control to (i) when the inputted imaging instruction is a first imaging instruction that is input by an operation performed on the operator, determine whether a touch operation has been initiated on the touch panel during the review display of the image which is captured according to the first imaging instruction, and
   when it is determined that the touch operation has been initiated on the touch panel during the review display of the image which is captured according to the first imaging instruction, further determine a state of the touch operation, and (ii) when the inputted imaging instruction is a second imaging instruction that is input by a touch release operation performed on the touch panel, determine, as a state of the touch release operation, whether the touch release operation is a touch operation continuing after the touch release that continues during the review display of the image which is captured according to the second imaging instruction since a time at which the second imaging instruction was inputted by the touch release operation, and control a method by which the review display is performed according to a determination result with respect to the state of the touch operation, when the inputted imaging instruction is the first imaging instruction, and according to a determination result with respect to the state of the touch release operation, when the inputted imaging instruction is the second imaging instruction.

2. The imaging device according to claim 1, wherein the CPU is further configured to:

when the inputted imaging instruction is the first imaging instruction and it is determined that the touch operation has been initiated on the touch panel during the review display of the image which is captured according to the first imaging instruction, determine, as the state of the touch operation, whether the touch operation is continuing.

3. The imaging device according to claim 2, wherein the review display of the image which is captured according to the first imaging instruction is continued for as long as it is determined that the touch operation is continuing during the review display of the image which is captured according to the first imaging instruction, even when the predetermined amount of time has elapsed.

4. The imaging device according to claim 3, wherein the CPU is further configured to:

when it has been determined that the touch operation is not continuing during the review display of the image which is captured according to the first imaging instruction and the predetermined amount of time has elapsed, stop the review display of the image which is captured according to the first imaging instruction, and switch to live view display in which the images from the imaging section are sequentially displayed as the live view images.

5. The imaging device according to claim 1, wherein the CPU is further configured to:

when the inputted imaging instruction is the first imaging instruction and it is determined that the touch operation has been initiated on the touch panel during the review display of the image which is captured according to the first imaging instruction, determine, as the state of the touch operation, a touch operation type according to a trajectory of the touch operation, and control the method by which the review display is performed according to the touch operation type having been determined, when the inputted imaging instruction is the first imaging instruction.

6. The imaging device according to claim 5, wherein the CPU is further configured to:

when it has been determined that the touch operation type is a slide operation, further measure a movement distance of the slide operation, and control the method by which the review display is performed according to the measured movement distance of the slide operation.

7. The imaging device according to claim 5, wherein the CPU is further configured to:

when it has been determined that the touch operation type is a character input operation, further recognize which character has been inputted by the character input operation, and control a method by which the review display is performed according to the recognized character.

8. The imaging device according to claim 1, wherein the CPU is further configured to:

when the inputted imaging instruction is the second imaging instruction and it is determined that the touch release operation is the touch continuing operation, continue the review display of the image which is captured according to the second imaging instruction for as long as it is determined that the touch operation is continuing during the review display of the image which is captured according to the second imaging instruction, even when the predetermined amount of time has elapsed.

9. The imaging device according to claim 8, wherein the CPU is further configured to:

when it has been determined that the touch operation is not continuing during the review display of the image which is captured according to the second imaging instruction and the predetermined amount of time has elapsed, stop the review display of the image which is captured according to the second imaging instruction, and switch to live view display in which the images from the imaging section are sequentially displayed as the live view images.

10. The imaging device according to claim 1, wherein the CPU is further configured to:

store and retain a current review display time as a previous review display time, and perform review display for an amount of time equal to the stored and retained previous review display time when review display is next performed.

11. An imaging processing method comprising:

in a state in which images from an imaging section are being sequentially displayed as live view images on a monitor screen, performing review display in which an image, which is captured by the imaging section according to an inputted imaging instruction, is displayed on the monitor screen for a predetermined amount of time after the image is captured, when the inputted imaging instruction is a first imaging instruction that is input by an operation performed on an operator different from a touch panel, determining whether a touch operation has been initiated on the touch panel during the review display of the image which is captured according to the first imaging instruction, and when it is determined that the touch operation has been initiated on the touch panel during the review display of the image which is captured according to the first imaging instruction, further determining a state of the touch operation, and when the inputted imaging instruction is a second imaging instruction that is input by a touch release operation performed on the touch panel, determining, as a state of the touch release operation, whether the touch release operation is a touch operation continuing after the touch release that continues during the review display of the image which is captured according to the second imaging instruction since a time at which the second imaging instruction was inputted by the touch release operation, and controlling a method by which the review display is performed according to a determination result with respect to the state of the touch operation, when the inputted imaging instruction is the first imaging instruction, and according to a determination result with respect to the state of the touch release operation, when the inputted imaging instruction is the second imaging instruction.

12. A non-transitory computer-readable storage medium having a program stored thereon that is executable by a computer to perform functions comprising:

in a state in which images from an imaging section are being sequentially displayed as live view images on a monitor screen, performing review display in which an image, which is captured by the imaging section according to an inputted imaging instruction, is displayed on the monitor screen for a predetermined amount of time after the image is captured, when the inputted imaging instruction is a first imaging instruction that is input by an operation performed on an operator different from a touch panel, determining whether a touch operation has been initiated on the touch panel during the review display of the image which is captured according to the first imaging instruction, and when it is determined that the touch operation has been initiated on the touch panel during the review display of the image which is captured according to the first imaging instruction, further determining a state of the touch operation, and when the inputted imaging instruction is a second imaging instruction that is input by a touch release operation performed on the touch panel, determining, as a state of the touch release operation, whether the touch release operation is a touch operation continuing after the touch release that continues during the review display of the image which is captured according to the second imaging instruction since a time at which the second imaging instruction was inputted by the touch release operation, and controlling a method by which the review display is performed according to a determination result with respect to the state of the touch operation, when the inputted imaging instruction is the first imaging instruction, and according to a determination result with respect to the state of the touch release operation, when the inputted imaging instruction is the second imaging instruction.

* * * * *